United States Patent [19]
Curzio

[11] Patent Number: 5,368,076
[45] Date of Patent: Nov. 29, 1994

[54] PROCESS AND APPARATUS FOR MANUFACTURING ROCKET EXIT CONES, AND THE LIKE

[75] Inventor: Frederick H. Curzio, Garden Grove, Calif.

[73] Assignee: Textile Products, Inc., Anaheim, Calif.

[21] Appl. No.: 771,344

[22] Filed: Aug. 30, 1985

[51] Int. Cl.5 .................... D03D 49/20; D03D 41/00; D03D 3/00; B63H 11/00
[52] U.S. Cl. ..................................... 139/305; 139/11; 139/384 R; 156/189; 264/103; 428/408; 428/902
[58] Field of Search ..................... 264/29.2, 29.5, 103; 428/36, 35, 113, 137, 288, 291, 408, 377, 902; 427/228; 156/173, 180, 189; 139/1 A, 305, 384 R, 11; 247/47.01

[56] References Cited

U.S. PATENT DOCUMENTS 4,063,684 12/1977 O'Brien et al. ................. 428/273
4,467,838 8/1984 Rheaume ........................... 428/408
4,495,231 1/1985 Laskaris et al. .................... 428/113

*Primary Examiner*—Donald P. Walsh
*Assistant Examiner*—Anthony R. Chi
*Attorney, Agent, or Firm*—Willie Krawitz

[57] ABSTRACT

Rocket exit cones, rocket motors, curved objects, and the like, are produced by weaving a fabric onto a non linear form and rotating the form to wind up the fabric as it is being woven. Compensation between the linear, flat shape of the fabric and a non linear shape of the wind up form is obtained by conforming the shape of the reed portion of the loom to the shape of the form, and by providing a constant and/or variable spacing between the reed elements. A uniformly wrapped, non linear shape is is produced by the process.

Following wrapping, the fabric shape is impregnated with resin, and cured to a carbonized and/or graphitized state. Finally, the cured shape may be machined to its desired size and contour, having uniform properties.

20 Claims, 3 Drawing Sheets

PROCESS AND APPARATUS FOR MANUFACTURING ROCKET EXIT CONES, AND THE LIKE

BACKGROUND OF THE INVENTION

This invention relates to a new and improved apparatus process for producing non linear shapes from woven graphite fabric. These non linear fabric shapes are then impregnated wit resin, cured and then usually machined to form products that may be used for rocket exit cones, rocket motors, and other components for rockets, and so forth. Other curved objects such as round tank bodies, etc., also may be manufactured by the process and apparatus of this invention.

Many publications have disclosed various techniques for producing exit cones for rockets from woven graphite fabric. Typical patents in this technology include: U.S. Pat. Nos. 497,579; 1,057,085; 2,771,659; 2,884,015; 3,272,672; 3,331,402; 3,707,996; 3,719,210; 4,252,154; 4,359,190; 4,467,838; and, 4,495,231. Foreign patents include: European Patent 0,044,760 A1; French Patent 1,069,282; and Japanese Patent 47-36227.

Some of the aforesaid patents disclose products which have inherent weaknesses, such as those processes which apply fitted fabric portions onto a non uniform mandrel, such as described U.S. Pat. No. 4,359,190. Other patents disclose the use of complicated equipment (U.S. Pat. No. 3,719,210). Still other patents disclose the application of a uniform weave employing relatively simple equipment, but the fabric is applied to a uniform mandrel (Japanese Patent 47-36227). Other patents disclose the application of a single fiber onto a rotating mandrel, but this technique is primarily a unidirectional form of reinforcement (European Patent 0,044,760 A1 and U.S. Pat. No. 3,272,672).

U.S. Pat. No. 4,495,231 discloses winding up a woven fabric over a non linear mandrel for use as a rocket tail cone. This technique, however, provides no mechanism for compensating between the difference of the fabric sheet which is linear, and the non linear mandrel. Consequently, the fabric will become distorted when it is built up on the rotating mandrel.

To a certain extent, problems concerning catastrophic failure of a rocket tail cone during launch can be overcome by building an exit cone having a thick wall for the conical portion. However, since the conical portion is the heaviest part of the exit cone, this adds considerable weight to the system. Consequently, either the range of the rocket becomes limited, or more fuel is required for launching, thereby imposing restrictions on the rocket design. Also, a heavy exit cone makes it difficult to site and handle the rocket prior to launch, and transporting the device also is difficult.

It would be preferred to produce an exit cone having conical wall thickness of about $\frac{1}{4}$ inch, or greater, while improving its tensile properties and structural characteristics. Moreover, if the usual conical wall thickness could be replaced by machining down to this $\frac{1}{4}$ inch thickness, the weight of the exit cone could be reduced greatly, and this would be extremely useful, particularly if the structural integrity and weight requirements were improved. A desireable process would produce exit cones of up to say, 6 feet in diameter, and up to about 8 feet long.

Also, it would be desireable to produce a uniform transition between the cylinder portion and the conical portion and air the same time conform the junction between the conical and cylinder portions to a desired shape.

In addition, a process for producing an exit cone is desired that would allow the fabricator the option of whether or not pressure should be applied to the wrapped fabric prior to the resin cure stage.

THE INVENTION

According to the invention, a new and improved process and apparatus is provided for producing non linear shapes from woven graphite fabric, and the like, and for producing resin-impregnated laminates therefrom Basically, the invention comprises feeding graphite fibers, and the like, through a loom, and conforming the shape and area of the loom reed to the shape of the non linear wind up form. In addition, the spacing between the reed elements is controlled to provide a variable weave and fabric density. Consequently, when the fabric is woven onto the form, the fabric will conform to the non linear shape of the form. The wound up fabric shape is uniform with respect to depth along the longitudinal axis of the form and is also uniform with respect to the orthogonal projection of filling yarns also along the longitudinal axis of the form.

When the fabric is applied to, or wrapped around the form, the filling threads diverge outwardly as the distance increases from the cylindrical portion and outwardly along the conical area to the end perimeter, as shown. Hence, a decreased area of the conical portion is covered by the filling threads. Normally, using prior art weaving techniques, this would produce gaps in the weave which would be covered by uniformly spaced warp fibers. However, the weave would still remain increasingly non uniform as the distance increased along the conical portion. According to the invention, use of a reed having a non uniform spacing between the reed elements will enable the gaps in the weave to be filled in more uniformly, and thereby compensate for the outward divergence of the filling fibers. This simple and inexpensive device overcomes problems involving use of expensive equipment presently used to wrap fibers on a non uniformly shaped wind up form.

Following wind up, the fabric shape is then impregnated with resin, cured, and then usually machined to a final accurate shape. Typical prepreg resins include pitch, epoxies, polyimides, phenolics, etc. If desired, a hybrid fabric of graphite fibers, and the like, interwoven with a resinous thermoplastic polymer fiber may be employed as the fabric. Such a fabric is described in my copending U.S. patent application, entitled: "METHOD AND APPARATUS FOR PRODUCING BLENDS OF RESINOUS THERMOPLASTIC FIBER, ND LAMINATED STRUCTURES PRODUCED THEREFROM", filed Sep. 6, 1983, as U.S. Ser. No.; 529,514, and incorporated herein by reference. Applicant's European Patent Application 0 138 294 published Apr. 24, 1985 also discloses the same hybrid fabric. The hybrid fabric may be cured under heat and pressure, with or without resin impregnation, depending on the desired properties of the product.

Typical reinforcing fibers that may be used for the hybrid fiber or the prepreg include carbon, fiberglass, quartz, ceramic, boron, aramid, silicon carbide, aluminum, steel, and the like. The impregnating resin may include polyimides, phenolics, epoxy, maleimides, pitch, etc., which have a high char residue. If a hybrid fabric is used, fiber forming thermoplastic resins such as polyester, polyimide, polyethylene, nylon, polypropylene, etc., are suitable as the interweave with the carbon fibers. In addition to fiber forming resins, film forming resins may be used, such as polyether ether ketones. These films can be slit into narrow strips and interwoven with the graphite fibers to form the hybrid fabric. The polyether ether ketone is sold by I.C.I. under the trademark of "VICTREX" PEEK.

DESCRIPTION OF THE PREFERRED EMBODIMENTS

Figure 2:
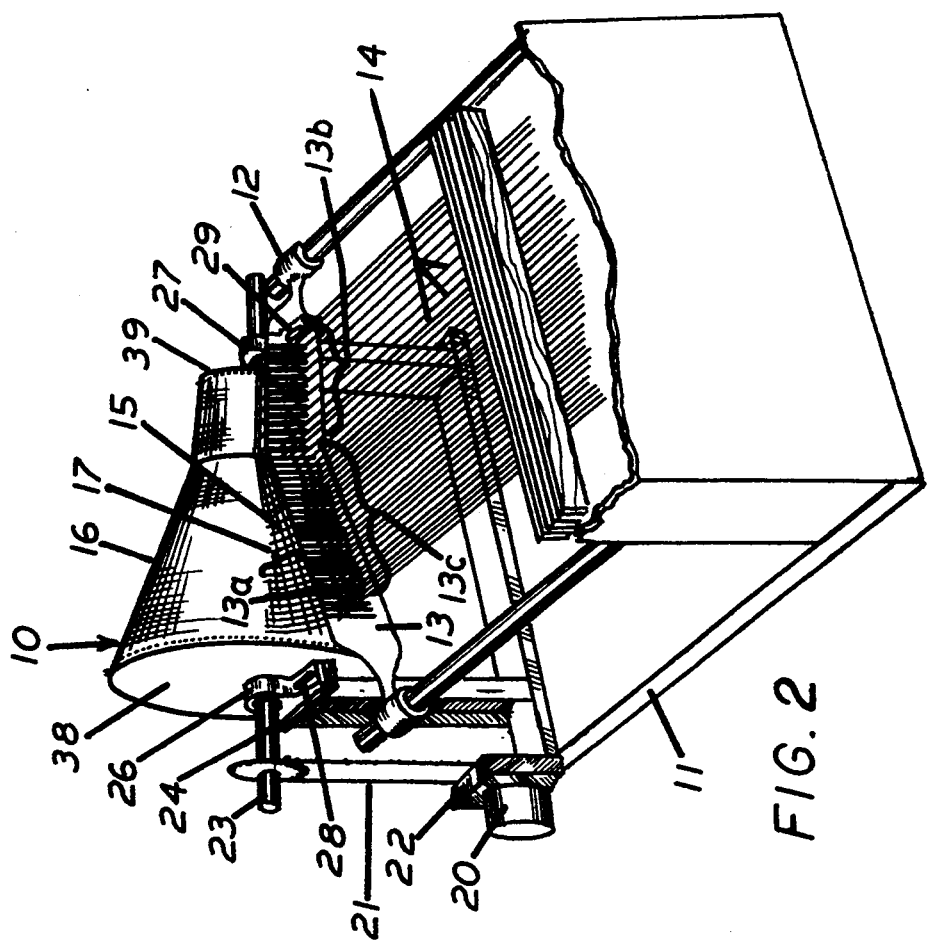
FIG. 2 is an external perspective view of the apparatus and wind up form in upper side elevation.
Figure 1:
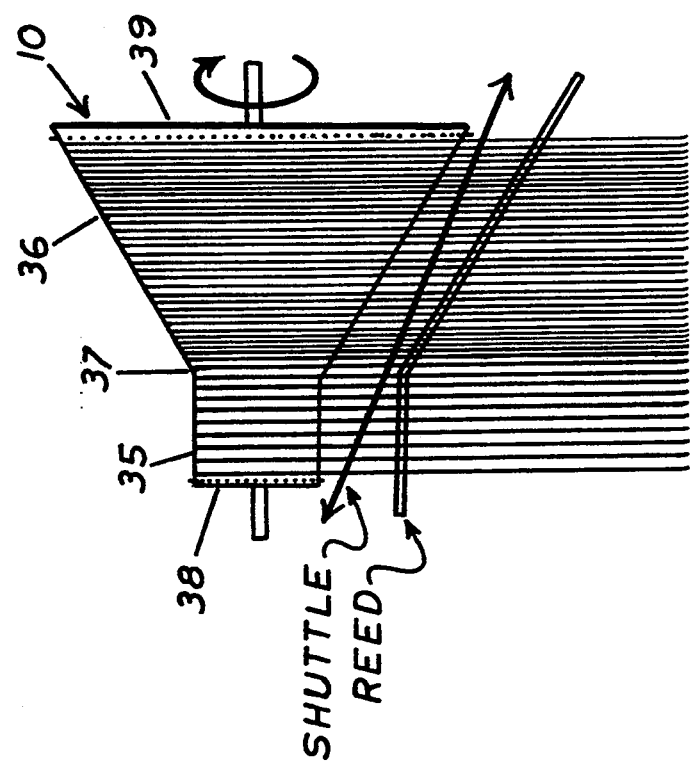
FIG. 1 is an external, plan view of the weaving apparatus showing fabric being wrapped onto a non linear wind up form after emerging from a shaped reed having a variable spacing between the reed elements.
Figure 3:
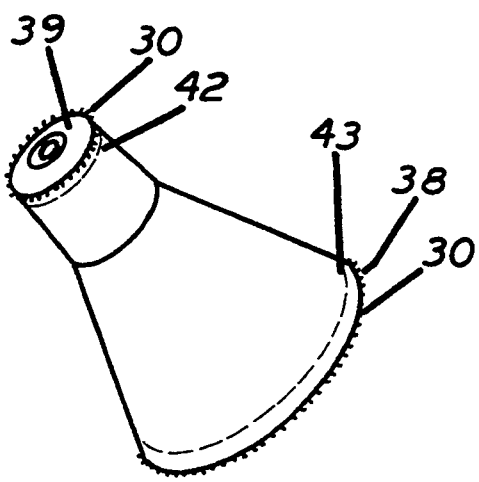
FIG. 3 is a perspective view of the wound up fabric form prior to curing.

The apparatus for producing exit cones, and the like, of this invention is shown in FIGS. 1, 2 and 3, and includes a non linear, carbon wind up form 10 rotatably mounted within an open framework 11. The wind up form is positioned adjacent the take off end of a weaving loom 12, and conforms to the shape of the wind up form. The loom includes a reed 13 having a variable spacing defined between reed elements 13a. One set of reed elements 13b provide a relatively large and constant distance between each element, while a second set of reed elements 13c provide a shorter but variable distance (decreasing-increasing) between each element. Typically reed element spacings may be employed to accommodate 1K–6K yarn, but obviously other yarn sizes may be used, and this will require different reed spacings.

Control of the reed area, the reed shape, and the reed spacing enables control of the fabric weave in terms of volume, density, the area over which a particular weave pattern is effected, and hence the fabric weight itself.

The reed element spacings can be continuously variable, or variable in steps, varying at a constant rate, constant, and constant plus variable the latter two possibilities being shown in FIG. 1. Furthermore, the reed element spacings can be made over say a 180° curvature of the reed.

By controlling the reed spacings, a variable fabric weave is produced which enables the fabric to conform to the non linear mandrel. The present system thereby obviates the requirement for a mechanical system that is frequently complicated, to perform a similar, but less adequate function. When woven onto the mandrel, the use of a controlled weave spacing prevents buckling, wrinkling, bulging, etc., of the built up fabric shape.

Graphite fibers 14 are fed through the reed elements which are spaced to provide a non uniformly woven fabric 15 that can be easily conformed with the non linear wind up form and produce a uniform fabric wrapping 16. If desired, the central longitudinal axis of the form may be inclined to the perpendicular direction of the fabric leaving the loom, to avoid distorting the fabric during winding up. Since the fabric 15 travels for only a short gap distance 17 after it has been woven on the loom, it can be wound up on the rotating form quite easily.

A motor 20 driving a sprocket chain 21 through a gear reduction box 22 rotates the wind up form 10. A drive shaft 23 mounts the form, and the shaft is secured between two end plates, one such end plate 24 being shown, which are bolted to the framework. Each end of the drive shaft 23 rotates within pillow blocks 26, 27, and these may be adjustable along slots 28, 29 for positioning the loom with respect to the loom.

The form 10 is accurately shaped to define a cylindrical portion 35, a conical portion 36, and an interface 37 that may be curved or angular. An engaging groove (not shown) along the wind up form enables the lead threads of the woven cloth to be engaged, and prevents slippage during wind up. Circular end retaining members 38, 39 are mounted at each end of the form 10, and bear a plurality of spikes 30 which are inserted into the form around the periphery near the end members. The spikes 30 pass through the fabric while it is being wrapped onto the form, and also prevent the fabric from slipping or unwrapping during wind up.

In operation, following the movement of warp fibers 14 through the reed element 13, the fabric 15 is woven onto the rotating form 10. Typical weave patterns are plain, satins, twills, etc. To monitor and control wrapping uniformity, a light colored tracer thread of, say DACRON, may be woven at intervals into the graphite fabric parallel to its width, although it is not essential to the process. If the threads remain linear during the fabric build up, the fabric is considered to be wrapped uniformly. However, if the threads deviate from an acceptable standard of linearity, the fabric wrapping can be varied by adjusting the feed rates, the angle of inclination of the form to the direction of fabric travel, the reed configuration, and the number and spacing of the individual reed elements.

When the wrapping process has produced an exit cone structure shape of sufficient thickness, the structure may be reinforced. This reinforced structure may then be impregnated with a resin that yields a high char residue such as from pitch, epoxy, polyimide, phenolics, etc. The impregnated structure is then cured, generally under heat and pressure. The curing will also burn out the DACRON tracer threads. As shown in FIG. 3, the wind up form 10 is then removed, and the ends of the cured structure are trimmed 42, 43 for proper sizing.

Figure 4:
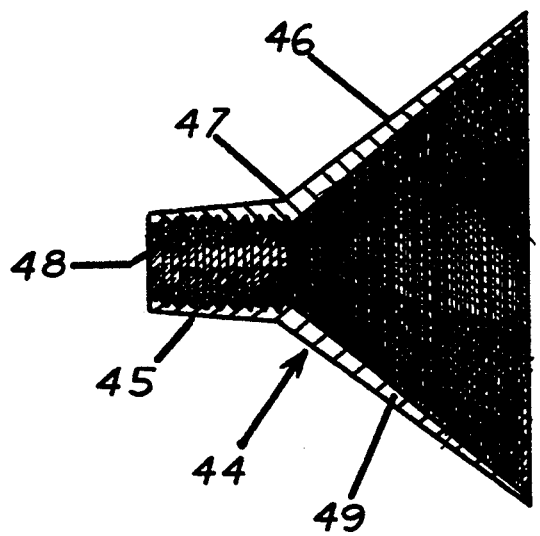
FIG. 4 is a view in sectional side elevation of the finished exit cone.

As shown in FIG. 4, the cured, integral structure may be machined internally and/or externally to its ultimate exit cone shape 44, having a cylindrical portion 45, conical portion 46, and a curved interface 47. The cylindrical portion may then be threaded 48 or otherwise machined on the inside or outside wall for attachment to a rocket. Alternatively, a threaded portion may be bonded into the cylinder. The conical wall 49 is shown as being machined to a tapered shape, but this is merely an optional design, and the conical wall could be of uniform thickness.

Figure 5:
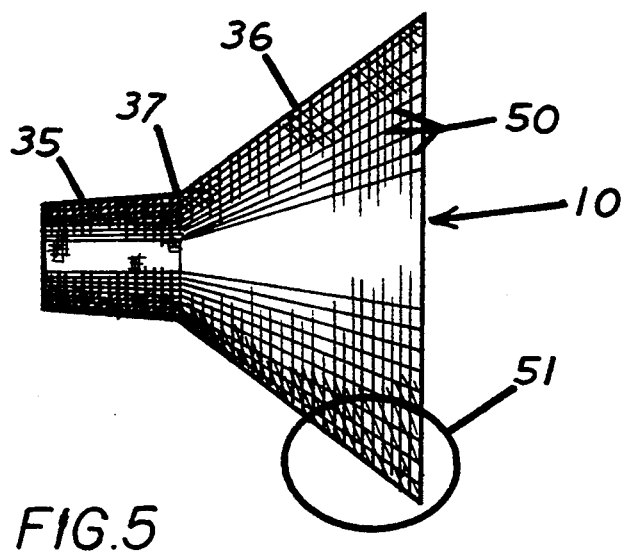
FIG. 5 is an external view in side elevation of a non uniform wind up form and the diverging thread patterns of filling fibers.
Figure 6:
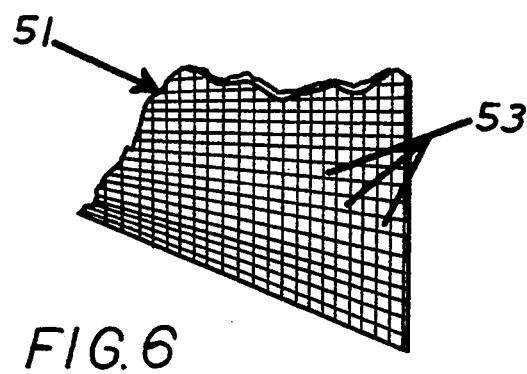
FIG. 6 is an enlarged plan view of fabric taken from the circled area of FIG. 5; and, FIGS. 7 and 8 are schematic views of two different reed configurations.

FIG. 5 illustrates the usual divergence of fibers 50 when weaving onto the non linear form 10, and FIG. 6 illustrates a swatch of fabric 51 taken from an enlarged portion 51 of FIG. 5. The result of weaving a non linear warp onto the diverging fibers produces individual patterns 53 that are approximately parallelograms having slightly curved sides; these patterns are sufficiently close to being rectangular, thereby producing an overall uniform fabric lay down on the form 10.

Figure 7:
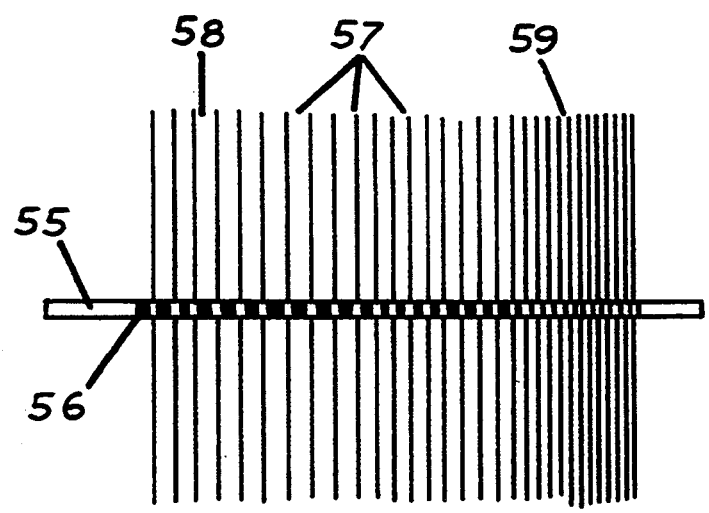
Figure 8:
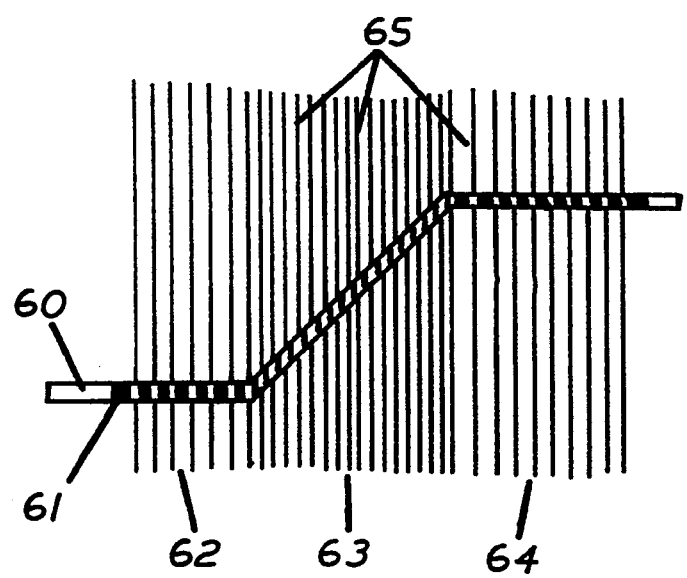

FIGS. 7 and 8 illustrate two different types of reed configurations. In FIG. 7, a straight reed 55 is shown, including reed elements 56 and reed spacings 57. These reed spacings decrease by a uniform amount, from a low fiber density 58 to a high density 59 to compensate for divergence of fibers on a non uniform mandrel.

In FIG. 8, a non linear reed 60 is shown, including reed elements 61, having reed spacings 62, 63 and 64. These different reed spacings compensate for changes in diverging patterns of fibers on a non uniform mandrel. These spacings produce a varying density of warp fibers 65 in the fabric weave.

Obviously, many variations of the present invention may be employed without departing from the spirit thereof. For example, multi units of exit cone shapes may be produced at one weaving station and a multi unit is segmented, impregnated with resin and converted into the cured laminate shape. Of course, the segmenting can occur at any stage in the succeeding processing steps, following the fabric build up.

I claim:

1. A process for producing an integrally formed, cured structure having a non linear shape from graphite fibers and the like, comprising the steps of:
   a) passing warp fibers through a loom, including a reed;
   b) weaving filling fibers into the warp fibers into the warp fibers to form a fabric;
   c) applying the fabric to a wind up form, including linear and non linear portions, to produce a fabric build up, the filling fibers providing a converging-diverging pattern corresponding to the non linear portion of the wind up form, and parallel patterns corresponding to the uniform portion of the wind up form, the warp fibers being applied in the fabric build up in a density pattern that varies with the non linear portion, and remains constant with the linear portion of the wind up form the wind up form being maintained stationary to the weaving step and reed means;
   d) the warp fibers being fed through the reed having a shape that conforms with the wind up form, and defining spaces between individual reed elements that vary with the non linear portion of the form, and remain constant with the linear portions of the wind up form;
   e) impregnating the fabric with a curing resin;
   f) curing the impregnated fabric shape to form a cured structure;
   g) removing the cured structure from the form; and,
   h) machining the structure to shape.

2. The process of claim 1, in which the graphite fibers and the like, are selected from the class consisting of: graphite, fiberglass, quartz, ceramic, boron, aramid, silicon carbide, aluminum, and steel, and the impregnating resin is selected from the class consisting of polyimides, phenolics, epoxy, maleimides, polyester, polyethylene, nylon, polypropylene, polyether ether ketone, and pitch.

3. The process of claim 1, in which control of fabric weaving is effected by control of reed area, reed shape, and spacing between individual reed elements.

4. The process of claim 3, in which the fabric weave is controlled in terms of volume, density and the area over which a particular weave pattern is effected.

5. The process of claim 4, in which the fabric build can be varied by adjusting feed rates of the fabric, and the angle of inclination of the form to the direction of fabric travel.

6. The process of claim 1, in which the cured structure provides a conical wall thickness exceeding about $\frac{1}{4}''$, a diameter up to about 6 feet and up to about 8 feet in length of the exit cone.

7. A fabric shape formed from graphired fibers, and the like, comprising:
   a) a non linear shape formed by passing warp fibers through a loom, including a reed, and weaving filling fibers into the warp fibers to form a fabric;
   b) the fabric being applied to a wind up form, including linear and non linear portions to produce a fabric build up, the filling fibers providing a converging-diverging pattern corresponding to the uniform portion of the wind up form, the warp fibers being applied in the fabric build up in a density pattern that varies with the non linear portion, and remains constant with the linear portion of the wind up form the wind up form being maintained stations to the weaving step and reed means;
   c) the warp fibers being fed through the reed having a shape that conforms with the wind up form and defining spaces between individual reed elements that vary with the non linear portion of the form, and remain constant with the linear portions of the wind up form; whereby the fabric is adapted to be:
      i. impregnated with a curing resin;
      ii. cured to produce a laminated structure;
      iii. removed from the form, and
      iv. machined to shape.

8. The fabric shape of claim 7, in which the fibers are selected from the class consisting of: graphite, carbon, fiberglass, quartz, ceramic, boron, silicon carbide, aluminum, and steel, and the impregnating resin is selected from the class consisting of polyimides, phenolics, pitch, epoxy, maleimides, polyester, polyethylene, nylon, polypropylene, and polyether ether ketone.

9. The fabric shape of claim 7, in which control of fabric weaving is effected by control of reed area, reed shape, and spacing between individual reed elements.

10. The fabric shape of claim 9, in which the fabric weave is controlled in terms of volume, density, and the area over which a particular weave pattern is effected.

11. The fabric shape of claim 10, in which the fabric build up can be varied by adjusting feed rates of the fabric, and the angle of inclination of the form to the direction of fabric travel.

12. The fabric shape of claim 7, in which the cured structure provides a conical wall thickness exceeding about $\frac{1}{4}''$, a diameter up to about 6 feet, and a length up to about 8 feet.

13. A laminate formed from woven graphite fibers, and the like, comprising:
   a) a non linear shape formed by passing warp fibers through a loom, including a reed, and weaving filling fibers into the warp fibers to form a fabric;
   b) the fabric being constructed by being applied to a wind up form, including linear and non linear portions, to produce a fabric build up, the filling fibers providing a converging-diverging pattern corresponding to the non linear portion of the wind up form, and parallel patterns corresponding to the uniform portion portion of the wind up form, the warp fibers being applied in the fabric build up in a density pattern that varies with the non linear portion, and remains constant with the linear portion of the wind up form the wind up form being maintained stationary to the weaving step and reed means;

c) the warp fibers being fed through the reed having a shape that conforms with the wind up form and defining spaces between individual reed elements that vary with the non linear portion of the form, and remain constant with the non linear portion of the form; the laminate being formed by:
 i. impregnation with a curing resin;
 ii. curing to produce a laminate structure;
 iii. removal from the form; and,
 iv. machining to shape.

14. The laminate of claim 13, in which the fibers are selected from the class consisting of: graphite, carbon, fiberglass, quartz, ceramic, boron, aramid, silicon carbide, aluminum, and steel, and the impregnating resin is selected from the class consisting of polyimides, phenolics, epoxy, maleimides, polyester, polyethylene, nylon, polypropylene, pitch and polyether ether ketone.

15. The laminate of claim 13, in which control of fabric weaving is effected by control of reed area, reed shape, and spacing between individual reed elements.

16. The laminate of claim 13, in which the fabric weave is controlled in terms of volume, density, and the area over which a particular weave pattern is effected.

17. The laminate of claim 16, in which the fabric build up can be varied by adjusting feed rates of the fabric, and the angle of inclination of the form to the direction of fabric travel.

18. The laminate of claim 13, in which the cured structure is an exit cone providing a conical wall thickness exceeding about ¼", a diameter up to about 6 feet, and a length up to about 8 feet.

19. An apparatus for producing an integrally formed fabric shape for conversion into a cured structure having a non linear shape, from graphite fibers, and the like, comprising:

a) weaving means for passing warp fibers through a loom, and weaving filling fibers into the warp fibers to form a fabric;

b) a wind up form for applying the fabric to produce a fabric build up the wind up form including linear and non linear portions, the filling fibers providing a converging-diverging pattern corresponding to the non linear portion of the wind up form and parallel patterns corresponding to the uniform portion of the wind up form, the warp fibers being applied in the fabric build up in a density pattern that varies with the non linear portion, and remains constant with the linear portion of the wind up form; and c) reed means contained in the loom for feeding the warp fibers therethrough, the reed being shaped to conform with the wind up form, and defining spaces between individual reed elements that vary with the non linear portions of the wind up form and remain constant with the linear portions of the wind up form the wind up form being maintained stationary to the weaving step and reed means; whereby,
 i. the fabric is adapted for impregnation with curing resin;
 ii. the impregnated fabric shape is adapted for curing to form a laminate structure;
 iii. the laminate structure is adapted for removal from the form; and,
 iv. the structure is adapted for machining to shape.

20. A reed for use in a weaving loom to produce a fabric from filling and warp fibers, the reed providing a shape that conforms with a wind up form to produce a built up fabric; the wind up form including linear and non linear portions; the reed defining spaces between individual reed elements that vary with the non linear portion of the form, and remain constant with the linear portions of the wind up form; the filling fibers providing a converging-diverging pattern corresponding to the non linear portion of the wind up form, and parallel patterns corresponding to the uniform portion of the wind up form, the warp fibers being applied in the fabric build up in a density constant with the linear portion of the wind up form the wind up form being maintained stationary to the weaving step and reed means.

* * * * *